Patented Nov. 16, 1926.

1,606,943

UNITED STATES PATENT OFFICE.

TREVOR S. HUXHAM, OF YORK, PENNSYLVANIA, ASSIGNOR TO AMERICAN INSULATOR CORPORATION, OF NEW FREEDOM, PENNSYLVANIA, A CORPORATION OF MASSACHUSETTS.

METHOD OF HARDENING FUSIBLE PHENOLIC RESINS AND PRODUCTS RESULTING THEREFROM.

No Drawing. Application filed March 27, 1924. Serial No. 702,430.

This invention relates to methods of hardening fusible phenolic resins and products resulting therefrom and has particular application to those which are prepared by the condensation of phenols and aldehydes. In using the words "phenols" and "aldehydes", I do not limit myself to the employment of resinous substances prepared from any specific phenol or aldehyde. I am limited, at present, to those which are practical from the standpoint of availability and economy. Notable among the phenols are carbolic acid ($C_6H_5OH$) and the cresols ($C_6H_4CH_3OH$) and among the aldehydes formaldehyde, acetaldehyde and furfural or their polymers.

Heretofore, in the manufacture of compositions for cold molding, it has been customary to employ resinous substances such as asphalts, coal tar pitches, and natural resins as binders for asbestos, mica, or other fillers. These resinous substances are usually fluxed with drying oils prior to mixing with fillers. After molding, the products are subjected to a prolonged baking operation, during which they become insoluble and infusible. Vast quantities of these materials are employed in molding insulation for electrical wiring devices, such as connectors for electric irons, extension light plugs, receptacles, double and triple light sockets, switch bases, etc., as well as automobile radiator caps, handles for steam valves, automobile horn buttons, knobs, and sockets for radio apparatus, etc. Due to the increasing cost of the natural resins and the wide variation in the properties of asphalts and pitches, the manufacturers of cold molded plastic products have turned to synthetic resins for use as binders in order to obtain more uniform products.

Attempts have been made to employ the condensation products of phenols and formaldehyde and its polymers as binders for cold molding compositions. Several methods have been tried but all these have one or more serious faults. If the condensation product is prepared with only a mild catalyst or without a catalyst, the odor of formaldehyde given off by the product is practically unbearable when large quantities are being handled. This is particularly true during the process of mixing with the filler and subsequent molding or pressing. The composition prepared from this product with a filler also has a great tendency toward adhering to the mold surface. This causes much difficulty. When the formaldehyde, required to carry the reaction over to the thermo-rigid stage, is present in a combined form as in combination with ammonia or aniline, forming hexamethylenetetramine or anhydro-formaldehyde-aniline, respectively, the odor of the product is eliminated but another serious fault develops. In this case, the product which is a viscous liquid, is unstable due to the large amount of catalyst present and must be used immediately or it will harden, as the reaction proceeds, forming a worthless mass.

The second method above described is employed in the preparation of compositions for hot molding. In this case, the condensation product is solid at normal temperatures and in solid phase, the reaction does not proceed until the temperature is raised. However, for cold molding, the liquid or semi-liquid phase is required to make the composition plastic at normal temperatures. Inasmuch as it is highly important that the product may be stored for a period of several weeks or a month without spoiling, the employment of a powerful catalyst in substantial quantities is not permissible.

It has also been proposed to produce a fusible synthetic resin by the action of formaldehyde on phenol and to add thereto furfural or furfuramid in the proportion of 8 to 40 per cent of the fusible resin thus produced, the thus treated product being then subjected to heat or to heat and pressure, whereby a hard and infusible product is obtained. This product has the serious disadvantage that it must be molded hot and that it hardens or sets slowly during such molding process.

It is known that certain amines of the aromatic series react with furfural even at atmospheric temperature to form resinous substances. See Meunier (Les Matiéres Grasses, 1916, 9, 4516); Mains and Phillips (Chem. and Met. Engineering, Vol. 24, p. 661, 1921). Aniline is particularly suitable and when mixed with furfural in substantially equi-molecular proportions generates heat and becomes turbid due to liberation of water. Water may be removed by evaporation or addition of a dehydrating agent, such as $CaCl_2$, and subsequent separation of the two layers formed. Continued heating yields a dark red to black resin, hard and brittle at 25° C.

I have discovered that "furfur-aniline" as the above product is called, is especially valuable as a hardening agent for fusible resinous products prepared from phenols and aldehydes. For example, a solution in suitable solvents of a fusible phenol-formaldehyde resin to which has been added a requisite quantity of furfur-aniline may be used as a binder for cold compositions or it may be employed as a varnish or enamel for coating or impregnating. Heating to a temperature in the neighborhood of 150° C. for a period of several hours forms a hard, tough, insoluble and thermo-rigid product.

The use of furfur-aniline as a hardening agent for resins has distinct advantages. It is relatively non-volatile at atmospheric temperature. It is comparatively free from objectionable odors. Incorporated with the resin, it may be kept for a prolonged period without deteriorating. It may be heated to a temperature not exceeding 90–100° C. without harmful effects. The final product after baking is a lustrous black resin.

The proportion of furfur-aniline required ranges upward to 90 parts by weight to 100 parts of fusible resin. Large proportions of furfur-aniline tend to make the final product brittle and weak. The resinous furfur-aniline as employed for the purposes of my invention is readily soluble in benzol, a mixture of alcohol and benzol, and in the resin.

In the preparation of cold molding compositions or for other uses, I may add various solvents of high boiling point such as certain coal tar distillates or their hydrogenated or chlorinated derivatives. Notable among these are naphtha, hydrocarbon oils, naphthalene, chlornaphthalenes, and hydronaphthalenes. I may also add oils or waxes or other modifying agents as may be required in various applications. Fillers such as asbestos, wood flour, mica, china clay, slate, talc, asbestine or other inert substances may be employed. Coloring matters may be used in certain cases, such as carbon black, dyes, etc.

In place of aniline, I may employ toluidine and certain other aromatic amines. These equivalents may be employed in substantially the same amounts and produce substantially the same results, although the aniline is more active, and is therefore, preferred.

In practicing the invention, the fusible resinous product is first formed from phenols and aldehydes in the usual manner. It is then placed in solution in a suitable solvent and furfur-aniline added thereto. The furfur-aniline may be added in varying proportions upward to 90 parts by weight to 100 parts by weight of fusible resin. The mixture may be heated to a temperature of substantially 150° C. for a period of several hours to form a hard, tough, insoluble and thermo-rigid product.

It is to be understood that I do not confine myself to the precise proportions or details of procedure herein set forth. The enormous variation in shape and requirements of cold molded articles necessitates modification and variation to obtain the desired properties, as will be understood by those skilled in the art. Thus, a composition for use in a mold of one shape may not be applicable for molding in another of different contour. The method outlined is simplified for clearness and the proportions are substantially representative of those used in actual practice but new conditions which continually arise demand various changes in the composition.

I claim:

1. A product of the class described comprising a fusible phenolic resin and the reaction product of furfural and an aromatic amine.

2. A product of the class described comprising a fusible phenolic resin and the reaction product of furfural and aniline.

3. The method of hardening fusible phenolic resins which comprises adding the product formed by the reaction of furfural and an aromatic amine thereto.

4. The method of hardening fusible phenolic resins which comprises adding the product formed by the reaction of furfural and aniline thereto.

5. The method of hardening fusible phenolic resins which comprises adding the product formed by the reaction of furfural and an aromatic amine thereto, and heating to form a thermo-rigid body.

6. The method of hardening fusible phenolic resins which comprises adding the product formed by the reaction of furfural and aniline thereto in the proportion of less than ninety parts of the reaction product to one hundred parts of the resin and heating to form a thermo-rigid body.

In testimony whereof, I affix my signature.

TREVOR S. HUXHAM.